United States Patent [19]

Uchiyama

[11] Patent Number: 4,555,076

[45] Date of Patent: Nov. 26, 1985

[54] FILM HANDLING DEVICE

[75] Inventor: Kaoru Uchiyama, Kanagawa, Japan

[73] Assignee: Fuji Photo Film Co., Ltd., Kanagawa, Japan

[21] Appl. No.: 629,399

[22] Filed: Jul. 10, 1984

[30] Foreign Application Priority Data

Jul. 11, 1983 [JP] Japan ............................... 58-126323

[51] Int. Cl.⁴ ......................... G03B 1/04; G11B 15/32

[52] U.S. Cl. ..................................... 242/195; 242/76; 226/91; 226/95; 226/189

[58] Field of Search ................. 242/76, 192, 195, 209, 242/210, 57; 226/91, 92, 95, 97, 189, 195, 183; 352/235

[56] References Cited

U.S. PATENT DOCUMENTS 3,643,893 2/1972 Neff ..................................... 242/195

3,670,989 6/1972 Andrews ............................ 242/192

3,912,205 10/1975 Koyama .............................. 242/188

4,485,981 12/1984 Krywiczanin ........................ 242/57

*Primary Examiner*—Leonard D. Christian

*Attorney, Agent, or Firm*—Sughrue, Mion, Zinn, Macpeak & Seas

[57] ABSTRACT

A film handling device for pulling out and forwarding a leader from a spool of film after the film has been removed from a film cartridge. The spool of film is held in a film guide having an arcuately formed rear portion shaped to receive the spool of film and a forward guide portion composed of straight sections converging towards a forwarding opening. A pair of film forwarding rollers are selectively engageable with the spool of film through cuts formed in the rear portion of the film guide. A detector positioned in the forward portion of the film guide detects the presence of the film leader. Before the presence of the film leader is detected, the film forwarding rollers rotate the spool of film in the film rewinding direction. Then, the direction of the rollers is reversed.

4 Claims, 2 Drawing Figures

FILM HANDLING DEVICE

BACKGROUND OF THE INVENTION

The present invention relates to film handling device, and more particularly, to a film handling device used for forwarding a film, which has been extracted from the film's cartridge, beginning from a front end portion thereof, termed a "leader".

It is difficult to automatically pull out and forward a leader of a film which has been removed from its cartridge without damaging other portions of the film. Accordingly, an object of this invention is to provide a film handling device with which the leader of a film removed from its cartridge can be automatically pulled out and forwarded.

SUMMARY OF THE INVENTION

The foregoing object of the invention has been achieved by the provision of a film handling device which comprises rotatable holding means for receiving and holding a film taken out of its cartridge, guide members for guiding the film which is being forwarded, and air flow forming means for urging the film in a film forwarding direction to forward the film beginning at the front end portion, in which, according to the invention, the holding means is designed to be rotatable in the film winding direction as well as the film forwarding direction. Further, film retaining means which is movable into and out of engagement with the film held by the holding means and detecting means for detecting when a chance for forwarding the film held by the holding means occurs are provided and arranged in such a manner that the holding means is turned in the film winding direction with the film retained by the film retaining means and is turned in the film forwarding direction when the detecting means detects the front end portion of the film.

DESCRIPTION OF THE PREFERRED EMBODIMENTS

Preferred embodiments of the invention will be described with reference to the accompanying drawings.

Figure 1:
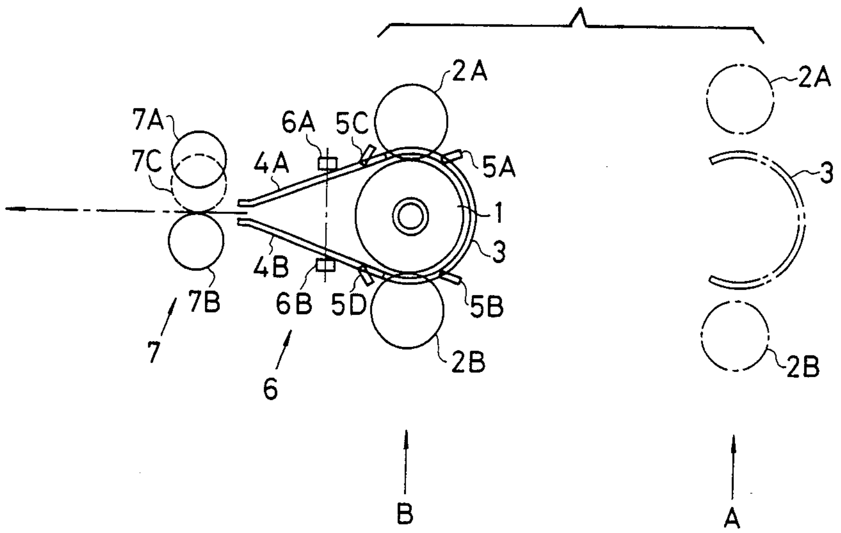
FIGS. 1 and 2 are side views of two examples of a film handling device for practicing a film handling method according to the invention.

FIG. 1 is a side view showing the essential components of a film handling device constructed according to a preferred embodiment of the invention. In FIG. 1, reference numeral 1 designates a spool on which a film F is wound; 2A and 2B, film retaining and forwarding rollers which are brought into contact with and moved away from the film F wound on the spool 1; 3, a film guide operating in cooperation with the film forwarding rollers 2A and 2B; 4A and 4B, guides for guiding the film when it is being forwarded; 5B and 5B, air blowing nozzles operating in cooperation with the guide 3; and 5C and 5D, air blowing nozzles operating in cooperation with the guides 4A and 4B. Further in FIG. 1, reference numeral 6 designates a detector composed of a light-emitting unit 6A and a light-detecting unit 6B; and 7A, a driven roller which is moved to a position 7C in response to a film detection signal outputted by the detector 6 to form a pair of nipping rollers 7 with a driving roller 7B.

The film forwarding rollers 2A and 2B are positioned in cuts which are formed in the film guide 3. The film forwarding rollers 2A and 2B, which are so designed that they prevent loosening of the film F wound on the spool 1, are reciprocated between positions where they are in contact with the film F and positions where they are apart from the film F. Furthermore, the rollers 2A and 2B are so designed that the directions of rotation thereof are changed in response to the film detection signal produced by the detector 6.

The film forwarding rollers 2A and 2B and the film guide 3 receive at a position A the spool 1 on which a film F has been wound, and then they are moved to a position B. The detector 6 is provided at the position where it does not detect the film F wound on the spool 1 between the guides 4A and 4B, but detects it when the front end portion FA of the film F is unwound in a manner described later, namely, when forwarding of the film is started. This position is, for instance, 5 to 15 mm from the surface of the film F wound on the spool 1.

The operation of the film handling device thus constructed will be described.

In a film removing step, a spool 1 on which film F has been wound is removed from the film cartridge. The spool 1 with the film F is transported to the film forwarding rollers 2A and 2B and the film guide 3, whereupon the rollers 2A and 2B and the film guide 3 move to the position B while holding the spool 1. In this case, the film forwarding rollers 2A and 2B lightly press against the film F. When, under this condition, the film forwarding rollers 2A and 2B are driven in the film winding direction while air is simultaneously being blown through the air blowing nozzles 5A and 5D, or 5B and 5C, in the film winding direction as detected in the preceding step, the front end portion FA, namely, the leader of the film F, being released from the film forwarding rollers 2A and 2B, reaches the position where it can be detected by the detector 6 while the rollers make at least a half revolution.

When the detector 6 detects the front end portion FA of the film F, a signal is applied to the drive control section of the film forwarding rollers 2A and 2B to change the directions of rotation of the rollers 2A and 2B. Thus, the front end portion FA of the film F is forwarded by means of the guides 4A and 4B and the air flows from the air blowing nozzles 5*a* and 5D, or 5B and 5C. The front end portion FA of the film thus forwarded is caught in the nip formed between the driving roller 7B and the driven roller 7A, which has been moved to the position 7C in response to the film detection signal from the detector 6.

Figure 2:
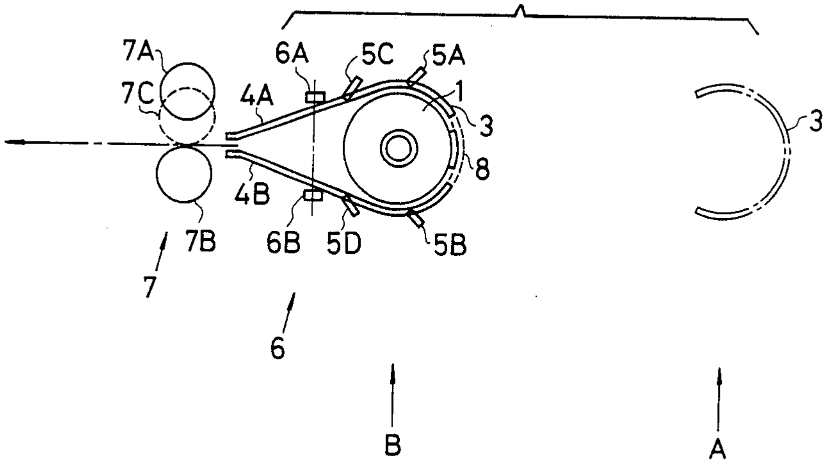

In the above-described embodiment, the film forwarding rollers 2A and 2B serve not only to forward the film, but also to prevent loosening of the film wound on the spool. However, it goes without saying that they may be replaced by a different arrangement, such as that shown in FIG. 2. In the embodiment of FIG. 2, the film F is forwarded by a spool driving device (not shown), and loosening of the film is prevented by a film retaining member 8 which is movable into and out of engagement with the film.

Furthermore, the film forwarding rollers 2A and 2B and the film guide 3 may be replaced, for instance, by endless belts or the like.

The air blowing nozzles 5A and 5B operate to provide a chance for forwarding the front end portion FA of the film and to suppress loosening of the film forwarded by the film forwarding rollers 2A and 2B, as is clear from the above description.

In the inventive film handling device for forwarding a film beginning at its front end portion which includes the rotatable holding means for receiving and holding a film removed from its film cartridge, the guide members for guiding the film which is forwarded, and the air flow supplying means for urging the film in the film forwarding direction, according to the invention, the holding means is designed so as to be rotatable in a film winding direction also, and the film retaining means, which is movable into and out of engagement with the film held by the holding means, and the means for detecting when the chance for forwarding the film held by the holding means occurs are provided and constructed in such a manner that the holding means is turned in the film winding direction with the film retained by the film retaining means, and is turned in the film forwarding direction when the detecting means detects the front end portion of the film. Thus, film leaders can be automatically extracted and forwarded using the film handling device of the invention. Furthermore, in the film handling device of the invention, film leaders can be forwarded completely in the same way irrespective of the film winding directions thereof.

I claim:

1. In a film handling device which comprises rotatable holding means for receiving and holding a film removed from a film cartridge thereof, guide members for guiding said film while being forwarded, and air flow supplying means for urging said film in a film forwarding direction to forward said film beginning at a front end portion thereof, the improvement wherein: said holding means is made rotatable in both a film winding and said film forwarding directions, and film retaining means movable into and out of engagement with said film held by said holding means and detecting means for detecting when a chance for forwarding said film held by said holding means occurs said holding means turning in said film winding direction when said film is retained by said film retaining means and turning in said film forwarding direction when said detecting means detects said front end portion of said film.

2. A device for handling film having a leader, comprising: a film guide, said film guide having a rear portion arcuately shaped to receive a spool of film; said guide having cuts formed at a rear portion thereof and shaped to receive a rotating means, and a forward portion comprising flat guides converging from said rear portion toward a forward opening; said rotating means comprising a first pair of rollers movable through said cuts into contact with film held on said spool of film, said first pair of rollers being rotatable in both a film forwarding direction and a film winding direction; a plurality of air flow nozzles positioned to provide air flows urging said leader of said film towards said forward opening; detector means positioned at said forward portion for detecting a presence of said leader; and a second pair of rollers disposed forwardly of said forward opening for forwarding said leader and said film after passing through said forward opening, wherein, said first pair of rollers are rotated in said winding direction until said detector means detects said presence of said leader, and then rotated in said film forwarding direction.

3. The film handling device of claim 2, wherein said air flow nozzles are at least four in number, one on each side of both of said cuts.

4. The film handling device of claim 3, wherein one of said rollers of said second pair of rollers is selectively disengageable from the other roller of said second pair of rollers.

* * * * *